United States Patent [19]
Klass et al.

[11] 3,864,628
[45] Feb. 4, 1975

[54] SELECTIVE SOLID-STATE GAS SENSORS AND METHOD

[75] Inventors: Donald L. Klass, Barrington; Carl D. Landahl, Chicago, both of Ill.

[73] Assignee: Institute of Gas Technology, Chicago, Ill.

[22] Filed: May 29, 1973

[21] Appl. No.: 364,755

[52] U.S. Cl. ............................... 324/71 SN, 73/23
[51] Int. Cl. ........................................... G01n 27/00
[58] Field of Search.................... 324/71 SN; 73/23; 204/195 P, 1 T; 23/232 E; 340/237

[56] References Cited
UNITED STATES PATENTS

| | | | |
|---|---|---|---|
| 3,493,484 | 2/1970 | Berg et al........................ | 340/237 R |
| 3,575,836 | 4/1971 | Sternberg........................ | 204/195 P |
| 3,603,954 | 9/1971 | Takeuchi ........................ | 340/237 R |
| 3,607,084 | 9/1971 | Mackey et al..................... | 23/232 E |
| 3,695,848 | 10/1972 | Taguchi...................... | 324/71 SN X |

*Primary Examiner*—Alfred E. Smith
*Assistant Examiner*—Rolf Hille

[57] ABSTRACT

A method for detecting gases by selectively moving a gas through a gas permeable membrane to a semiconductor sensor which qualitatively reports such gas as an electrical output after a predetermined time lag. The time-output information is recognized as a result of previous calibration of the sensor and gas permeable membrane with known gases, such calibrations comprising standards for comparison. The method is practiced to advantage with a gas detection assembly including a housing which holds a gas permeable membrane in spaced relationship to the gas sensor which may operate at elevated temperatures from a heating element therein. The gas detection assembly is used in circuits having detection means which may be audio or visual, including meter readout.

15 Claims, 5 Drawing Figures

SELECTIVE SOLID-STATE GAS SENSORS AND METHOD

This invention relates to a method for qualitatively and quantitatively detecting gases, and the invention also relates to an improved electrical gas detection circuit means.

Serious efforts have been exerted in the art to provide means and devices for detecting gases quickly and reliably. The gases which the art wishes to detect in such a manner are generally the polluting, toxic or combustible gases. Such gases may exhibit all these properties, such as carbon monoxide, or they may be essentially polluting and combustible, such as the light hydrocarbons, and the like. Still other gases may exhibit essentially only one of these attributes, such as hydrogen which is highly combustible. Efforts in the art have included application of electrochemical cell principles ot devise procedures which have come to be identified generally as polarography. In general, wet electrolyte cells are provided with electrodes wherein gases such as hydrocarbons are electrooxidizable at the anode and gases such as oxygen are electroreducible at the cathode. Representative teachings in the art which utilize such polarographic cells include U.S. Letters Pat. Nos. 2,913,386; 3,305,457; and 3,325,378. The polarographic approach presents some problems such as the bulk of the cells, consumable electrodes, limitations associated with immersing the gases in the electrolyte, and the like.

A solid-state gas sensor has been recently introduced to the art by Figaro Engineering Inc. of Osaka, Japan. This semi-conductor gas sensor is composed of bulk N-type metal oxides such as tin oxide, zinc oxide, and ferric sesquioxide. This device has come to be known as the Taguchi Gas Sensor, or TGS. This gas sensor converts a concentration of gas or smoke into an electrical signal by changing resistivity after exposure to the concentration of gas or smoke. The unit absorbs deoxidizing or combustible gases, such as hydrogen, carbon monoxide, methane, other hydrocarbons, alcohols, as well as still others. The resulting decrease in electric resistance is often large enough to be reported even without any amplification. Circuits have been designed to respond to this change in resistance by actuating a silicon controlled rectifier to set off an alarm. The TGS solid-state sensor is provided with a heating element which consumes up to 2 watts when the sensor is powered by up to about 1½ volts. Such power consumption heats up the TGS sensor up to about 500 degrees C.

The TGS sensor responds very rapidly in the presence of a deoxidizing or combustible gas, but it does not respond selectively so as to qualitatively report the presence of a gas. The electrical signal or output of the TGS Sensor also presents problems of variability, for example, the TGS sensor responds to hydrogen gas by its output decreasing as the gas flow rate increases. Other problems relate to the exceptionally quick response of the TGS Sensor to gases such as hydrogen and methane. This is desirable in the interest of obtaining a rapid report of a quick alarm, but it presents impediments to utilizing time delays or lags to let the TGS unit operate as a selective sensor. Another property of the TGS Sensor which hinders selectivity is the near uniform levels of the final outputs or electrical signals for given gases. The general near-similarties of such final outputs work against efforts to exploit variations to impart features of selectivity into the TGS Sensor. It is also demonstrated that the TGS Sensor responds to gas concentrations which are somewhat limited in their range. In addition, the response of the TGS sensor unit to gases such as hydrogen is non-linear over this somewhat limited range. Such non-linearity also frustrates efforts to utilize output levels for purposes of selectivity and quantitation.

It is accordingly one important object of the present invention to provide a method, apparatus and means wherein a selective gas permeable membrane is combined with a non-selective solid-state gas sensor device so that a predetermined gas can move through a membrane selected for high permeation relative to that gas, and said permeated gas can generate an electrical output following a characteristic time lag.

Still yet another important object of the present invention is to utilize a lightweight solid-state gas sensor in a small, compact electrical detection package that can be powered by a low level direct current voltage source, the entire package being carried and stored.

Yet another important object of the present invention is a method in which selected gas permeable membranes are used in combination with solid-state gas sensors so that output of the gas sensor, after characteristic time lag periods, qualitatively reports the presence of a gas by reference to preexisting standards established by calibrating the gas sensor with that membrane and with known gases.

Still yet another important object of the present invention is to provide an improved assembly of bulk solid-state gas sensor having a heating element; and a gas permeable membrane positioned in spaced relationship to the sensor and closing the path of a test gas moving towards the sensor.

Yet still another important object of the invention in an electrical gas detection means or system in which a solid-state gas sensor is powered by a low level voltage so that a characteristic electrical output moves along conductors to actuate detection means such as a flashing light, an audio signal, or a meter readout. It is an aspect of this object that various circuit designs may be provided with solid-state components; and that the detection means may be actuated in different ways to qualitatively and quantitatively report the presence of gases through preselected gas permeable membranes using one or more gas sensor and membrane assemblies.

The foregoing objects are now attained together with still other objects which will occur to practitioners after considering the following disclosure of the invention which includes drawings, wherein.

Figure 4:
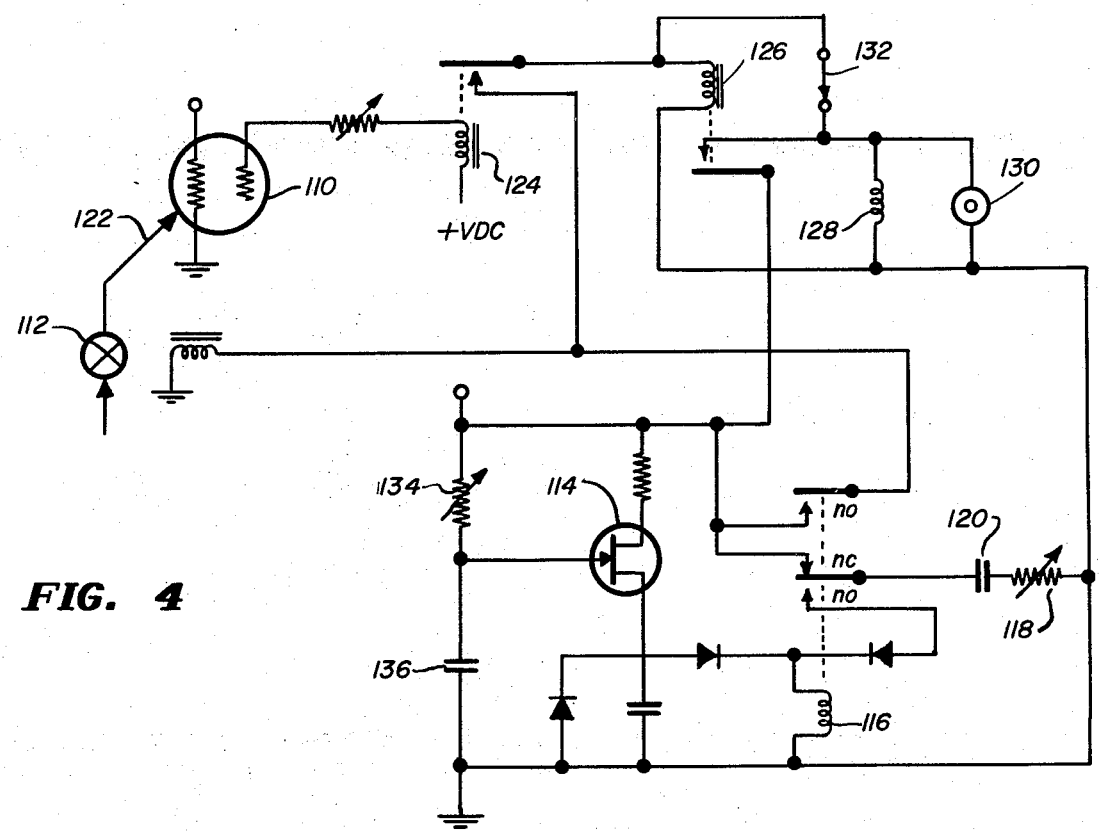
Figure 5:
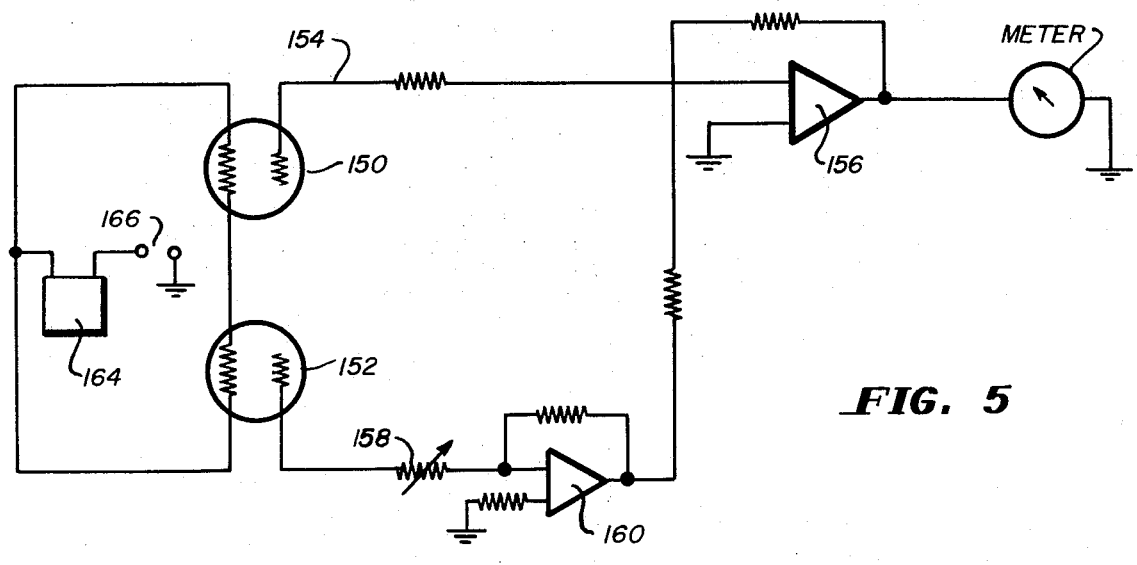

FIG. 4 is a highly schematic representation of still another alternative embodiment of an electrical gas detection means utilizing controlled purging gas in association with a test gas used for contacting the gas sensor; and FIG. 5 is a highly schematic representation of yet another alternative embodiment of an electrical gas detection means utilizing a plurality of gas sensor and gas permeable membrane assemblies.

Use of the same numerals in the different views of the drawings will indicate a reference to the same structures, parts, or elements, as the case may be.

Particular reference will be made herein to the Taguchi Gas Sensor or TGS Solid-State Gas Sensor element or unit. It is understood, however, that equivalent units of solid-state gas sensors are likewise operable. Such solid-state or semi-conductor gas sensors include the crystalline semi-conductors of the bulk or thin film type. Generally, the N type sensors may be formed from germanium or silicon doped with phosphorous, arsenic or antimony. The P type may be represented by germanium or silicon doped with boron, aluminum, gallium, or indium. Non-crystalline bulk type solid state gas sensors may also be selected. These comprise the oxide glasses blended with dopes such as sulfur, selinium or tellerium. It has been found that combining the TGS Sensor with a preselected gas permeable membrane results in unexpected advantages and improvements which allow the combination to qualititatively report the presence of a gas, and to even report such presence in a semi-quantitative manner. The combination is provided so that the gas permeable membrane is in spaced and fixed relationship to the gas sensor, whereby the heating element within the gas sensor does not damage the organic membrane. Use of the membrane delays the output of the gase sensor for time periods which are characteristic for a particular gas and a particular membrane with known permeation constants. Not only is the output delayed by a characteristic time lag, but the output is more linear in relation to the concentration of gas which contacts the solid-state gas sensor. It has been also discovered that the output for given gases and membranes tends to be stabilized irrespective of the flow rate of the gas moving past the sensor. Not only is the output delayed by characteristic time lags, but the time required to stabilize the output is also delayed by characteristic time lags, that is, the attainment of a more or less steady output level.

The characteristic time lags are determined for preselected gas permeable membranes and known gases through precalibration. Particular gases, or mixture of gases are delivered to a particular membrane of known thickness, and the response time in detecting an output is recorded. In addition, response times may be recorded for attaining a steady or stabilized output. Similarly, output levels may be recorded for corresponding response times. All such precalibrated time-response information can be used to verify the identity of an unknown or suspected test gas. It will be appreciated that different gases will have different characteristic time-responses with particular membranes. Such membranes are generally selected so that the permeation constant of the gas to be sensed is high relative to the permeability constants of other gases which may be present in a mixture.

Various membranes may be used which are selective for particular gases having known permeation constants, for example:

| GAS | MEMBRANE |
| --- | --- |
| Methane | Polychloroprone |
| Hydrogen | Teflon FEP |
| Sulfur dioxide | Geon-220 |
| Carbon monoxide | Silicone rubber |
| Tert-butylmercaptan | Polyvinylchloride |
| Hydrogen | Polyethylene |
| Hydrogen | Polyester (Mylar) |

The gas permeable membranes are not exclusively selective for one gas relative to another, but the higher permeation constants of certain gases can be used to advantage. For example, both hydrogen and methane diffuse through polyethylene film of one or two mil thickness, but the permeation constant of hydrogen through such a film is twelve times higher than methane. Likewise, both hydrogen and methane permeate through polyester film of equivalent thickness, but the hydrogen has a permeation constant which is about ninety times greater than methane. The permeability constant of any gas is equal to the product of the diffusion coefficient and the solubility coefficient where:

$K = DS$
$K =$ Permeability constant
$D =$ Diffusion coefficient
$S =$ Solubility coefficient If a test stream has a mixture of two gases, then the permeability constant of one gas must be substantially greater then the permeability constant of the other gas in order to selectively detect the concentration of the gas with the greater permeability constant. The permeation of the test gas must desirably attain a steady-state condition so that the electrical output of the solid-state gas sensor is likewise stabilized or steady. This occurs, of course, after the characteristic time lapse for that gas and that membrane. Detecting the concentration of the gas provides a quantitative determination in addition to the qualitative determination or actual presence of a particular gas.

The qualitative determination can be ascertained even if permeability constants are not widely disparate for two gases in a mixture. Once a particular gas mixture is carefully precalibrated with a particulate membrane, then qualitative determination is still possible before permeation reaches a steady-state condition. Even though permeability constants may be fairly equal, the diffusion and solubility coefficients may differ which will present a different output pattern during non-steady diffusion. Checking such an output pattern with the precalibrated non-steady output pattern can confirm a qualitative determination.

The following examples are presented to illustrate the practice of the invention, but practitioners will recognize that such examples are not intended to represent exclusive embodiments.

LIGHTER FLUID AND LINE GAS RESPONSE

A TGS sensor is exposed directly to a lighter fluid vapor supplied by the Gulf Oil Corporation, such vapor being a mixture of naphtha and moderate to hogh molecular weight volatile hydrocarbons. The same TGS Unit is exposed directly to line gas or natural gas conventionally piped to a laboratory. The line gas and ligher fluid vapor is next delivered to a one mil thick polyethylene film which closes the path to a TGS sensor. The polyethylene film is positioned in spaced relationship to the TGS element by encapsulating the element with the film shaped as a bag. The elapsed time is carefully noted after gas exposure and until the output level of the TGS sensor actuates a detection means. The results are presented in following Table I:

TABLE I

| TGS Sensor | Line Gas | Response Time-Seconds Lighter Fluid | Lighter Fluid Vapor/Line Gas Ratio |
|---|---|---|---|
| Bare | 1 | 1 | 1 |
| Polyethylene Encapsulated | | | |
| Run 1 | 10 | 28 | 2.8 |
| Run 2 | 8 | 32 | 4.0 |

The response times of the bare TGS sensor are almost instantaneous. The response times of the membrane encapsulated TGS sensor are considerably shorter for line gas than for the lighter fluid vapor as shown by absolute values and the ratio figures.

EXAMPLE 2

Response Times of Hydrogen, Methane and Mixtures Thereof

Various gases and mixtures of gases were directed against a bare TGS sensor unit and a TGS sensor unit after passing through a two mil thick polyethylene membrane. The plateau current was recorded as voltage across a resistance of five K ohms. The plateau current or the steady output level corresponds to the steady state condition of the gas contacting the TGS sensor, whether bare or through a membrane. The tme was recorded until a 95% plateau value was attained and the time was also recorded to attain a plateau level after the 95 percent value.

Results were obtained as shown in following Table II:

bilized value whereas the hydrogen requires 38 minutes, or a 65 percent greater time period. The distinctively long time lags for the TGS sensor provided with a membrane is a characteristic useful for identifying such gases.

EXAMPLE III

Effect of Gas Flow Rate on Gas Sensor Response

The following example illustrates the improved reliability of response of a gas sensor used in accordance with the present invention as compared with a bare gas sensor.

A bare TGS sensor assembly is placed in a flowing stream of 90 percent air and 10 percent carbon monoxide. A meter read out from 0–100 in the sensor assembly provides a visual indication of the relative carbon monoxide concentrations. A flow rate of the gas mixture at a linear velocity of 1 inch per second across the bare sensor provides a reading of 60 on the meter. Increasing the linear velocity to 20 inches per second results in the visual indicator meter decreasing its reading to 40. The readout is therefore increased with increasing flow rates despite no change in the concentration of the carbon monoxide.

The same TGS sensor is provided with a silicone rubber gas permeable membrane so that the feed gas mixture must first contact the membrane before contacting the TGS sensor. The visual indicator readout is 25 for both linear velocities of 1 inch per second and 20

TABLE II

| | TGS Type Sensor Without Membrane | | | TGS Type Sensor With Polyethylene Membrane (2 mil) | | |
|---|---|---|---|---|---|---|
| Gas Composition | Plateau Current (as voltage) | Time (Min) to 95% Value | Time (Min) Waited After 95% Value | Plateau Current (as Voltage) | Time (Min) to 95% Value | Time (Min) Waited After 95% Value |
| 1.2% CH$_4$ in air | 48 | 0.7 | 1.0 | 25.3 | 5 | 38 |
| 1.2% H$_2$ in air | 65 | 0.08 | 1.0 | 22.5 | 0.5 | 45 |
| 0.6% CH$_4$ + 0.6% H$_2$ in air | 69 | 0.06 | 0.8 | 23.1 | 6 | 15 |
| 100% CH$_4$ | 70 | 0.03 | 1.0 | 75 | 23 | 37 |
| 100% H$_2$ | 77 | 0.03 | 1.0 | 76 | 38 | 110 |

It will be seen that for the bare TGS sensor, the output levels are quite similar for 100 percent hydrogen, 100 percent methane and mixtures of methane and hydrogen and air. Unexpectedly, the output levels for 100 percent methane and 100 percent hydrogen are essentially the same for the bare TGS sensor and the sensor provided with a membrane. It is also seen that the bare TGS sensor responds almost instantaneously to the various gases, whereas the TGS sensor provided with a membrane required a substantially longer time for the output to achieve the same levels. A further variation is evident to help distinguish the gases, namely, the longer time lag for 100 percent hydrogen as compared with 100 percent methane when these gases contacted the TGS sensor provided with the membrane. The methane required 23 minutes to attain a 95 percent stainches per second. The reliability of the membrane and sensor assembly is demonstrated for different flow rates, as compared to the unreliability of the bare sensor with such changing flow rates.

EXAMPLE IV

Improved Range Operability and Linear Characteristics of Membrane and Sensor Assembly The silicone rubber membrane and sensor assembly used in Example III is subjected to various concentrations of carbon monoxide in air. The readout meter scale factor is adjusted to read 100 at 100 percent carbon monoxide concentrations. The visual readout is essentially directly proportional to the carbon monoxide concentration between 0 and 100 percent concentrations; that is, at 75 percent carbon monoxide concentrations, the reading is about 75, and at 25 percent carbon monoxide concentrations, the reading is about 25.

This same feed gas mixture with the same varying amounts of carbon monoxide are then directed at a bare TGS sensor. Such a bare TGS sensor is saturated at 1 percent carbon monoxide concentration, and the output of the sensor reaches it maximum value at this concentration. It is further demonstrated that the output of the bare TGS sensor between 0 and 1 percent carbon monoxide concentration is not linear.

EXAMPLE V

Oxygen Presence in Feed Gas Mixtures

The gas permeable membrane should likewise be permeable to oxygen as well as the gas which is to be preferentially separated and collected. The presence of the oxygen assures desirable response times of the membrane and sensor assembly.

A TGS and polyester membrane assembly (Mylar) is provide, the membrane being permeable to both oxygen and hydrogen. The membrane and sensor assembly is placed in a circuit which includes an audio device preset to sound an alarm at threshold concentrations of 2 percent hydrogen and air. Placing the membrane and sensor assembly in a 2 percent hydrogen-air mixture at ambient temperature resulted in the alarm sounding within 30 seconds.

The same TGS gas sensor is used but with a membrane which has an extremely low permeability for oxygen while retaining a permeability to hydrogen which is similar to the polyester membrane previously used. Placing this TGS sensor and low oxygen permeation membrane in the same mixture of 2 percent hydrogen and air results in the alarm sounding only after the assembly has been exposed for 30 hours.

EXAMPLE VI

Use of Membrane with Sensor Having No Heating Element

The heating element is disconnected in the assembly used in foregoing Example V. The sensor and membrane assembly is placed in an atmosphere of 4 percent hydrogen and air at 0°C. The audible alarm sounds within 45 seconds. Repeating the experiment with the heater element reconnected results in an audible alarm being sounded within 35 seconds.

EXAMPLE VII

Selective Sensing With Substantially Non-Selective Membrane

The silicone rubber membrane and sensor assembly used in Example III is used in a circuit, and feed gas mixture of methane and hydrogen is delivered to the assembly. The permeability of this membrane to these gases is similar and the Separation Factor is low as seen from the following:

|  | Permeability | Solubility | Diffusivity |
|---|---|---|---|
| Methane | 80 | 0.6 | 13 |
| Hydrogen | 55 | 0.13 | 43 |
| Separation Factor |  | $H_2/CH_4$ | 0.7 |

It is evident from the above data that nearly equal flows of the gases occur during steady-state conditions. However, the hydrogen gas arrives at the sensor first to induce a response in the sensor. The sensor assembly is therefore selective for detecting the presence of hydrogen, even though the silicone membrane is not selective for this gas.

Reference is now made to the drawings.

Figure 1:
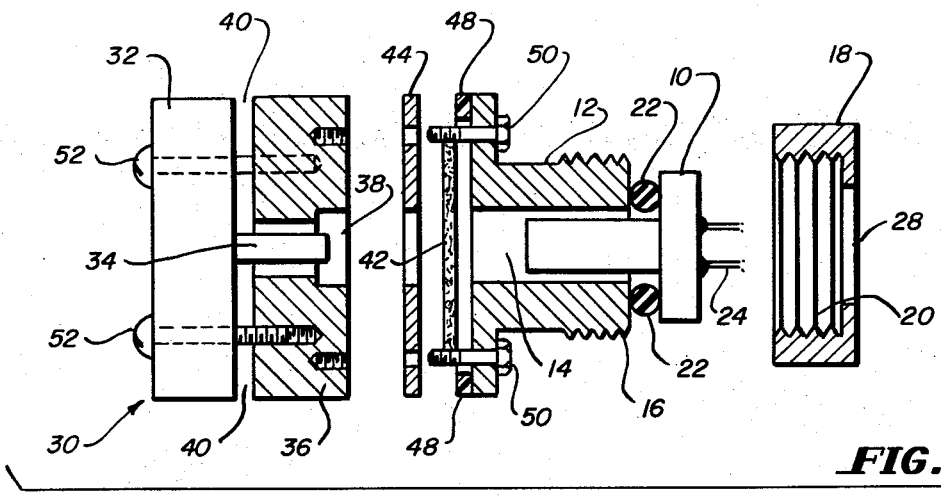
FIG. 1 is a side elevational exploded view, partly in section, showing an assembly of the solid-state gas sensor and the gas permeable membrane.

FIG. 1 illustrates a bulk N-type solid-state gas sesnor 10 positioned partly within support element 12 which has passageway 14 open at opposite ends. The support element 12 is provided with threads 16 on its external wall so that locking element 18 with interior threads 20 may securely lock the gas sensor 10 and the support element 12. An O-ring 22 is provided to effect a gas-tight seal. The gas sensor has conductors 24 which extend through opening 28 of the locking element or cap 18. The conductors or contacts 24 are joined to conductor means in various electric detection means or systems as will be later described.

A gas entry structure is shown generally as 30 and includes body part 32 which adjoins gas cavity part 36 having an enlarged void, cavity or gas chamber 38. Gas ports 40 are provided between body part 32 and gas cavity part 36, such ports communicating with the gas chamber 38. A gas permeable membrane 42 is positioned between passageway 14 of the support element 12 and the gas chamber 38. A gasket 44 is provided between flange 46 of the support element 12 and the cavity part 36. A spacer bellows 48 is further provided around membrane 42. Adjusting screws 50 fasten support element 12 to gas cavity part 36, said screws passing through openings in the gasket 44. These screws are provided to variously space body parts 12 and membrane 42 to thereby adjust the volume of passageway 14. The gas composition and volume are factors in determining sensor responses, depending on other conditions. Mounting screws 52 fasten body part 32 to gas cavity part 36. The foregoing housing assembly provides that the gas permeable membrane is positioned in spaced relationship with the solid state gas sensor, said membrane adjoining the gas cavity and gas ports. The organic membrane is therefore kept out of contact with the solid state gas sensor which may be heated to high temperatures upon application of power from a voltage source.

Figure 2:
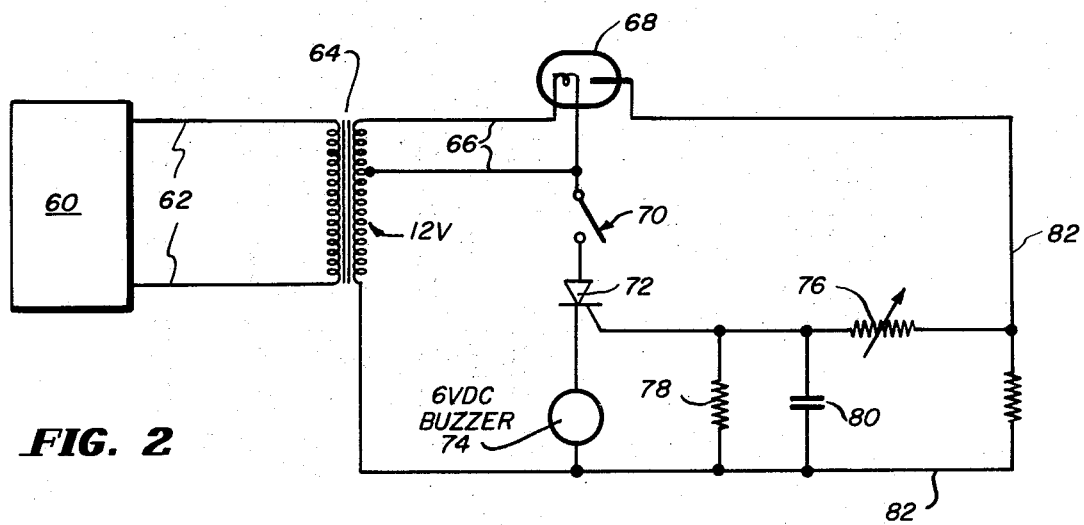
FIG. 2 is a schematic representation of an electrical gas detection means powered by an alternating current voltage source.

FIG. 2 illustrates a schematic drawing of electrical circuit detection means wherein voltage from alternating circuit detection means wherein voltage from alternating voltage source 60 is coupled via conductor lines 62 to a step-down transformer 64. A 1.2 volt source is tapped from the transformer 64 and is coupled via the conductor lines 66 to a membrane and TGS sensor element, collectively shown as 68, for energizing or powering the assembly, as well as turning off an alarm following actuation. A switch 70 is shown with an SCR unit 72 which rectifies current to operate buzzer 74. A variable resistor 76, together with resistors 78 and 79, and capacitor 80, operate to set the threshold at which SCR will be triggered by the assembly becoming conductive in the presence of the test gas. Conduction of the SCR will cause the direct current buzzer, powered by the stepdown voltage from the transformer 64, to sound until switch 70 is opened.

Figure 3:
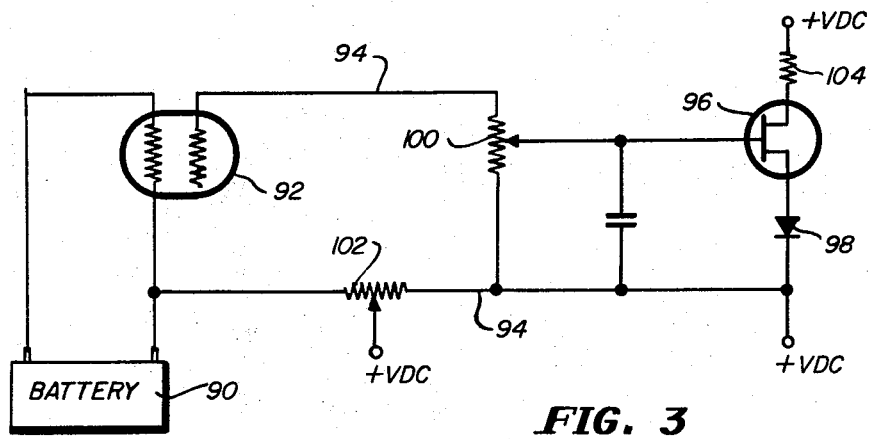
FIG. 3 is a schematic representation of an alternative embodiment of an electrical gas detection means powered by low level direct current voltage source.

FIG. 3 shows another embodiment wherein a low level voltage source, such as one volt direct current battery 90, operates the membrane and TGS sensor element collectively shown as 92. The output of the gas sensor is coupled via the conductor line 94 to operate a unijunction transistor oscillator 96. As the gas concentration increases at the gas sensor resistance decreases causing a faster rate of oscillation which flashes light emitting diode 98 at a faster rate. Resistor 100 is adjusted to attain occasional flashing at zero gas concentration to provide a continuous check of battery and lamp operation. A 5,000 ohm resistor 102 may be provided to increase voltage to about 10 volts in the conductor line. A 600 ohm resistor 104 may be provided to attain a 30 volt drop along oscillator 96. The embodiment of FIG. 3 operates to great advantage with a TGS sensor covered by a polyester membrane (Mylar) and is highly selective for hydrogen gas.

The embodiment of FIG. 4 illustrates a system which operates to advantage for detecting gas mixtures of n-hexane and methane. A TGS solid-state sensor receives gas advantageously through a polyethylene membrane, such an assembly being collectively shown as 110. Although not shown, a low level direct current voltage is used to power the solid-state sensor. The system includes a solenoid valve 112 which is in normal open position to allow a purged gas to move against the gas sensor assembly. A unijunction transistor oscillator 114 periodically energizes relay 116 for a period of time as determined by settings of variable resistor 118 and capacitor 120. During the time the relay 116 is energized, solenoid valve 112 moves to closed position to stop the flow or purged gas across the gas sensor so that test gas may flow to the gas sensor along line 122. In the presence of n-hexane, the TGS sensor quickly lowers its resistance causing relay 124 to be energized and in turn to latch relay 126 thereby actuating buzzer 128 and light 130. The detection or warning signals remain actuated until reset switch 132 is momentarily opened. In the presence of methane, the gas sensor assembly 110 requires a longer time to respond then is the case with n-hexane. Resistor 118 and capacitor 120 are selected so tha relay 116 denergizes before the methane reaches the sensor assembly 110. Variable resistor 134 and capacitor 136 are selected so that an adequate purge time elapses before repeating the cycle with additional flowing test gas.

The embodiment shown in FIG. 5 utilizes the steady state characteristics or plateau values of two membrane and solid gas sensor assemblies, one having a polyethylene membrane at 150 and one having a polyester (mylar) membrane at 152. The embodiment is used to particular advantage to operate as a methane sensor in the presence of hydrogen and air. The test gas stream contacts both gas sensor assemblies simultaneously. When methane contacts assembly 150, the TGS element changes its resistivity and an output is coupled via conductor line 154 to operate solid state amplifier 156. At such time the assembly 152 provides essentially no output. The presence of hydrogen in the mixture induces assembly 152 to generate gas. Such an output is scaled at variable resistor 158 and adjusted at logarithmic amplifier 160 to compensate for the hydrogen induced response at assembly 150. The final output is thereby inhibited at such a time. When methane contacts the sensor assembly 150, an output response further lowers its resistance which, in turn, provides an output at amplifier 156. The sensor assemblies are powered by direct current battery source 164, but a higher voltage may be provided at 166.

The claims of the invention are now presented, and the terms used therein may be further understood by reference to the language of the preceeding specification and the views of the drawings.

What is claimed is:

1. A method for detecting a selected gas with a solid state gas sensor present in an electric circuit with output detection means, including the steps of
   exposing said gas sensor to gases, including the selected gas, only through a gas permeable membrane which is highly selective for permeating said selected gas, and
   determining the characteristic time response lag of said sensor to said selected gas by actuation of the circuit detection means.

2. A method for detecting gases which includes the steps of claim 1 above wherein the gas sensor is a bulk N-type metal oxide sensor.

3. A method for detecting gases which includes the steps of claim 2 above wherein said method is practiced for detecting the presence of hydrogen, and said gas sensor is exposed to said hydrogen gas only through a polyester gas permeable membrane which is highly selective for permeating hydrogen.

4. A method for qualitatively detecting gases which includes the steps of claim 2 above wherein the method is practiced for detecting methane, and said gas sensor is exposed to said methane only through a polychloroprene permeable membrane which is highly selective for permeating said methane.

5. A method for qualitatively detecting a selected gas which includes the steps of claim 2 above, and which further includes the step of comparing said time response lag with standardized time-output information for that selected gas with said membrane.

6. A method for qualitatively detecting gases which includes the steps of claim 2 above in which the electric circuit further includes means for measuring current output, and which further includes the steps of
   awaiting current output to become substantially steady,
   recording the elapsed time to reach such steady current output, and
   comparing said time-output with standardized time-output information for known gases permeating said membrane.

7. A method for qualitatively detecting gases which includes the steps of claim 5 above and which further includes moving a mixture of at least two gases through a gas permeable membrane highly selective for one of said gases to expose a gas sensor thereto, at the same time, moving said gas mixture through a second gas permeable membrane highly selective to permeation of the other gas in the mixture to expose another gas sensor to that gas, compensating for the output which corresponds to the most readily permeated gas through one of said membranes, and noting the electrical output of the other of said gases which permeates more readily through the other of said gas permeable membranes, said output being then compared with standardized time-output information for known gases with said known other membrane.

8. An electronic gas detection means for detecting a selected gas including
   a solid-state gas sensor and a gas permeable membrane spaced from and covering an inlet to said gas sensor for providing a characteristic time lag as the selected gas permeates said membrane and activates said sensor,
   a voltage source connected to said gas sensor, conductors joined to said gas sensor, and detection means, being responsive following a characteristic time lag, to predetermined levels of electrical output from the gas sensor resulting from the lowering of its resistivity after exposure to a gas.

9. An electronic gas detection means which includes the features of claim 8 above wherein said voltage source is a low level direct current voltage, and wherein said detection means include an indicating means and a unijunction transistor oscillator which frequency increases with electrical output of the gas sensor, said oscillator correspondingly actuating said indicating means.

10. An electronic gas detection means which includes the features of claim 9 above wherein the voltage source is an alternating current voltage, said electric gas detection means further including a step-down transformer and rectifier means for rectifying the output thereof so that said detection means may be actuated by direct current.

11. An electronic gas detection means which includes the features of claim 10 above which further includes a purging gas source for directing gas against the gas permeable membrane, electrical switching means normally open to allow such purged gas to move to the membrane, a first relay, means to enegize said first relay for a predetermined time period, said energized first relay closing the electrical switch means to stop the flow of purging gas to the gas membrane, a second relay energized by the changing electrical output of the gas sensor, and a third relay means actuating the detection means, and reset switch means for opening the energized circuit for the detection means to thereby deactivate it.

12. An electronic gas detection means which includes the features of claim 8 above wherein said voltage source is a low level direct current voltage, and which further includes a second solid-state gas sensor having a heating element, and a gas permeable membrane spaced from and covering an inlet to said second gas sensor, said gas permeable membrane associated with said gas sensor, amplifier means for amplifying the output from one of said gas sensors, logarithmic amplifier means for amplifying the output from the other said gas sensors, and variable resistor means for adjusting the logarithmic amplifier means to compensate for the output of one of the gas sensors which gas permeable membrane is more highly selective for a gas in a mixture contacting both gas sensors.

13. A method for detecting gases which include the steps of claim 1 wherein said characteristic time response lag is determined by recording the time response to attain a recordable output level of said sensor.

14. A method for detecting gases which include the steps of claim 1 wherein said characteristic time response lag is determined by recording the time response to attain a steady output level of the sensor.

15. A method for detecting gases which includes the steps of claim 1 wherein said characteristic time response lag is determined by recording the output level of the sensor at a predetermined response time.

* * * * *